United States Patent
Väre et al.

(10) Patent No.: US 10,692,373 B2
(45) Date of Patent: Jun. 23, 2020

(54) METHOD FOR PROVIDING INFORMATION TO INFORMATION REPRESENTATION UNITS FOR A PUBLIC TRANSPORTATION VEHICLE

(71) Applicant: Teleste Oyj, Littoinen (FI)

(72) Inventors: Jani Väre, Kaarina (FI); Kari Virtanen, Naantali (FI); Kimmo Ylander, Forssa (FI); Jyrki Alamaunu, Turku (FI)

(73) Assignee: Teleste Oyj, Littoinen (FI)

( * ) Notice: Subject to any disclaimer, the term of this patent is extended or adjusted under 35 U.S.C. 154(b) by 0 days.

(21) Appl. No.: 16/327,351

(22) PCT Filed: Aug. 23, 2016

(86) PCT No.: PCT/FI2016/050576
§ 371 (c)(1),
(2) Date: Feb. 22, 2019

(87) PCT Pub. No.: WO2018/037151
PCT Pub. Date: Mar. 1, 2018

(65) Prior Publication Data
US 2019/0228655 A1    Jul. 25, 2019

(51) Int. Cl.
*G03B 21/00*    (2006.01)
*G08G 1/123*    (2006.01)
(Continued)

(52) U.S. Cl.
CPC ............ *G08G 1/123* (2013.01); *G08G 1/133* (2013.01); *H04L 67/10* (2013.01)

(58) Field of Classification Search
CPC ......... G08G 1/123; G08G 1/133; H04L 67/10
(Continued)

(56) References Cited

U.S. PATENT DOCUMENTS 4,791,571 A * 12/1988 Takahashi ............. G08G 1/127
340/910
6,681,174 B1 * 1/2004 Harvey .................. G08G 1/127
340/433
(Continued)

FOREIGN PATENT DOCUMENTS

GB    2453723 A    4/2009
WO    0063866 A1   10/2000

OTHER PUBLICATIONS

Search report of international application PCT/FI2016/050576 issued by Finnish Patent Office dated Dec. 15, 2016, pages.

*Primary Examiner* — Mark S Rushing
(74) *Attorney, Agent, or Firm* — Berggren LLP

(57) ABSTRACT

A method and related apparatus for providing information to information representation units, the method comprising: determining, in a network server, information to be provided to at least one information representation unit (200); transmitting the information to at least one mobile node (100) travelling on a predetermined route passing in the vicinity of said at least one information representation unit (202); and in response to the mobile node (100) approaching said at least one information representation unit, transmitting the information from a short-range low power transmitter (112) of the mobile node (100) to a short-range low power receiver (114) of the information representation unit (204).

9 Claims, 2 Drawing Sheets

(51) Int. Cl.
  *G08G 1/133* (2006.01)
  *H04L 29/08* (2006.01)
(58) Field of Classification Search
  USPC .......................................................... 340/994
  See application file for complete search history.

(56) References Cited

U.S. PATENT DOCUMENTS

| | | |
|---|---|---|
| 2006/0074545 A1* | 4/2006 | Kim ...................... G08G 1/123 |
| | | 701/117 |
| 2010/0188265 A1 | 7/2010 | Hill et al. |
| 2011/0078934 A1 | 4/2011 | McDougall et al. |
| 2011/0221615 A1 | 9/2011 | Chiu |
| 2013/0166712 A1* | 6/2013 | Chandramouli ...... H04L 43/065 |
| | | 709/223 |
| 2014/0244326 A1* | 8/2014 | Modica .................. G08G 1/123 |
| | | 705/7.13 |
| 2017/0076511 A1* | 3/2017 | Busch-Sorensen .... G07C 5/008 |

* cited by examiner

METHOD FOR PROVIDING INFORMATION TO INFORMATION REPRESENTATION UNITS FOR A PUBLIC TRANSPORTATION VEHICLE

PRIORITY

This application is a U.S. national application of the international application number PCT/FI2016/050576 filed on Aug. 23, 2016, the contents of which are incorporated herein by reference.

TECHNICAL FIELD

The invention relates to public information representation units, specifically to an arrangement for providing information to the information representation units.

BACKGROUND

Various kinds of information representation units, such as display units are nowadays common in public places. The display units may be arranged to display various information, such as advertisements, commercials, timetable information, notifications, etc.

Wireless and battery/solar cell powered displays are becoming more popular, for example, for providing time table information of public transportation vehicles. Such display units, typically e-ink displays, may be provided along the routes of the public transportation vehicles in stations or at bus/tram stops for showing up-to-date time table information intended to passengers waiting at the station or the stop.

Traditionally, the display units have been provided with a power supply cable connected to an electricity network, and often with a data cable connected to a data network for providing the updated data to the display. In case of wireless and battery/solar cell powered display units, the power consumption of all operations carried out within display unit must be as minimal as possible. This poses challenges for carrying out the information update to display units, since it is not preferable to use any receivers with a high power consumption at the wireless display units. Especially, in case of a plurality of display units, if the information is such that it needs to be updated frequently and/or the information is different for each display unit, providing the information updates becomes problematic.

SUMMARY

Now, an improved arrangement has been developed to at least alleviate the above-mentioned problems. As different aspects of the invention, we present a method and a system, which are characterized in what will be presented in the independent claims.

The dependent claims disclose advantageous embodiments of the invention.

The first aspect comprises a method for providing information to information representation units, the method comprising: determining, in a network server, information to be provided to at least one information representation unit; transmitting the information to at least one mobile node travelling on a predetermined route passing in the vicinity of said at least one information representation unit; and in response to the mobile node approaching said at least one information representation unit, transmitting the information from a short-range low power transmitter of the mobile node to a short-range low power receiver of the information representation unit.

According to an embodiment, the information representation unit is self-powered in terms of power supply.

According to an embodiment, the information is transmitted between the mobile node and the information representation unit using Bluetooth Low Energy (BLE) transmitters and receivers.

According to an embodiment, the information representation unit comprises one or more sensors arranged to detect status information relating to the operation conditions of the information representation unit and/or monitoring information about the surroundings of the information representation unit, the method further comprises: in response to the mobile node approaching said information representation unit, transmitting the status and/or monitoring information from a short-range low power transmitter of the information representation unit to a short-range low power receiver of the mobile node.

According to an embodiment, the mobile node is a public transportation vehicle, such as a train, a tram, a metro train or a bus, arranged to travel a predetermined route.

According to an embodiment, the information to be transmitted to the information representation unit comprises at least time table information about one or more public transportation vehicles travelling on a predetermined route passing in the vicinity of said at least one information representation unit.

According to an embodiment, the method further comprises: transmitting, from said one or more public transportation vehicles, location information and identity of each vehicle periodically to at least one server; updating, by said at least one server, time table information regarding public transportation vehicles approaching said information representation unit on the basis of the location information and identities of the public transportation vehicles; and transmitting the updated time table information at least to the public transportation vehicle arriving next in the vicinity of the information representation unit.

According to an embodiment, said at least one server belongs to a server cloud arranged to implement a service managing said time table information and at least one public transportation vehicle comprises a processing unit arranged to operate as a cloud edge server in said service.

A second aspect relates to a system comprising at least one network server, a plurality of information representation units, and at least one mobile node arranged to travel on a predetermined route passing in the vicinity of at least one information representation unit, wherein the network server is arranged to determine information to be provided to at least one information representation unit; and transmit the information to said at least one mobile node; and the mobile node is arranged, in response to approaching said at least one information representation unit, to transmit the information from a short-range low power transmitter of the mobile node to a short-range low power receiver of the information representation unit.

A third aspect relates to an apparatus, preferably a server, comprising at least one processor and at least one memory, said at least one memory stored with code thereon, which when executed by said at least one processor, causes the apparatus to perform: determine information to be provided to at least one information representation unit; and transmit the information to at least one mobile node travelling on a predetermined route passing in the vicinity of said at least one information representation unit for forwarding the information to the information representation unit.

These and other aspect and the embodiments related thereto will become apparent in the detailed description further below.

BRIEF DESCRIPTION OF THE DRAWINGS

The invention will now be described in more detail in connection with preferred embodiments with reference to the appended drawings, in which.

DETAILED DESCRIPTION

Figure 1:
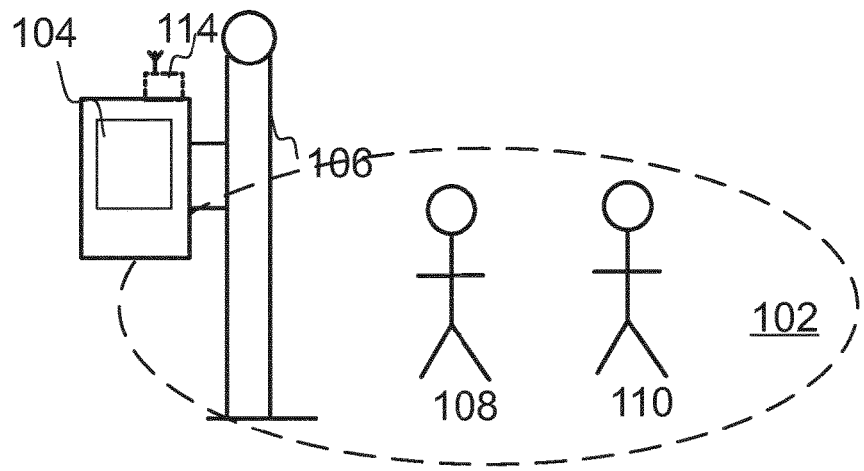
FIG. 1 shows a simplified example of a framework where the embodiments can be implemented.
Figure 1:
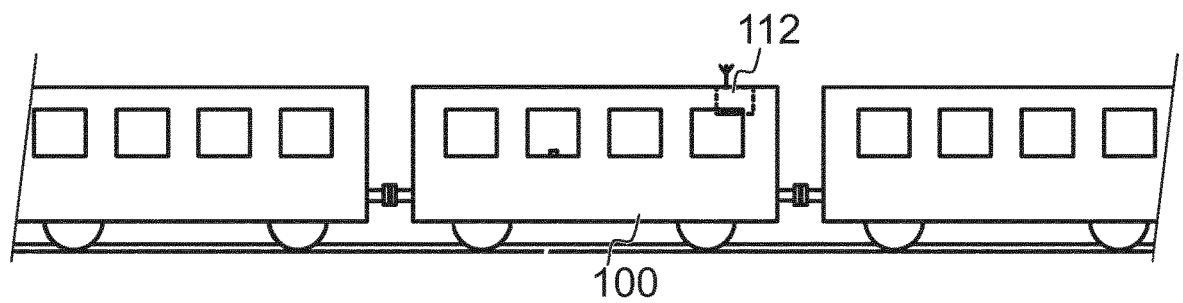

FIG. 1 shows a simplified example of a framework where the embodiments can be implemented. FIG. 1 shows a public transportation vehicle 100, in this example a tram, arriving at a tram stop 102. The tram stop is provided with a display unit 104. A public transportation vehicle, such as a train, a tram, a metro train or a bus, is typically arranged to travel a predetermined route, whereby a plurality of public display units 104 are typically arranged along said route. The public display units may be positioned, for example, at the stations or stops where the vehicle is configured to stop in a visible place, such as attached high at a post 106 or a stop shelter (not shown), for showing information intended to passengers 108, 110 waiting at the stop. The display units 104 may be arranged to display various information, such as timetable information, notifications, advertisements, commercials, etc.

The display units have traditionally been provided with at least the power supply, and typically with the data transmission, using a cable; i.e. there is a power supply cable connected to an electricity network, and often a data cable connected to a data network for data transmission. However, as the display technology advances, wireless display units are becoming an emerging trend. Compared to wired display units, self-powered, such as battery/solar cell operated, wireless display units provide significant savings in installation and operation costs. For example, when installing traditional wired display units in public places, the installation of cabling may raise up to 70% of the total costs.

However, while the wireless display units provide many advantages, there emerges a new problem of how to update the information to be displayed on each display unit. Especially, if the information is such that it needs to be updated frequently and/or the information is different for each display unit, providing the information updates becomes problematic. It is not desirable to provide the wireless display units with cellular modems or broadcast receivers due to the high power consumption of such devices. On the other hand, providing the updated information to each display unit manually is cumbersome and in most cases practically impossible.

In order to alleviate these problems, a new method for providing information to public display units is presented herein. The method is based on the idea that a network server centrally coordinates the information updates for each display unit or any other information representation unit and utilizes a mobile node travelling pass an information representation unit for delivering the information update intended for said particular information representation unit using a short-range low power technology.

Herein, the term "information representation unit" may refer to a display unit, nevertheless without limiting to display units solely. The information representation unit may comprise a loudspeaker alone or combined with a display unit, and the information updates may comprise audio messages or announcements to be represented via the loudspeaker. Additionally or alternatively, the information representation unit may comprise any other information representation means. However, for the sake of clarity, many of the following exemplified embodiments are described by referring to a display unit.

Figure 2:
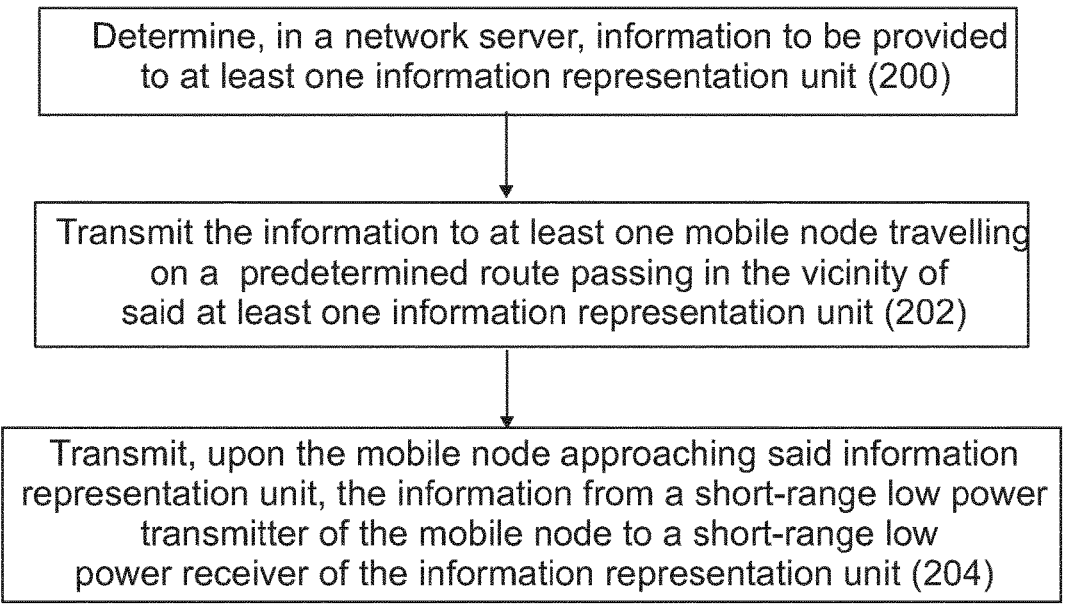
FIG. 2 shows a flow chart of an information update process according to an embodiment.

A method according to a first aspect and various embodiments related thereto are now described by referring to the flow chart of FIG. 2. In the method, a network server determines (200) information to be provided to at least one information representation unit. The information is transmitted (202) to at least one mobile node travelling on a predetermined route passing in the vicinity of said at least one information representation unit, and in response to the mobile node approaching said at least one information representation unit, the information is transmitted (204) from a short-range low power transmitter of the mobile node to a short-range low power receiver of the information representation unit.

Referring back to FIG. 1, it is shown that the mobile node 100 (i.e. the tram) is provided with a short-range low power transmitter 112, preferably a transceiver, and the display unit 104 is provided with a short-range low power receiver 112, preferably a transceiver.

Consequently, the network server is responsible for determining the information updates for each information representation unit, such as the display unit. The network server is aware of mobile nodes, such as public transportation vehicles, continuously travelling a predetermined route passing a particular display unit. The network server determines at least one mobile node, preferably the mobile node passing next the particular display unit, and sends the information updates intended for said particular display unit to the determined mobile node, for example using a mobile communication network, such as a cellular network or a wireless distribution system comprising a plurality of WLAN access points. When the mobile node approaches, possibly stops, in the vicinity of the particular display unit, the information update intended for said particular display unit is transmitted from the mobile node to the display unit using a short-range low power technology.

Hence, the centrally controlled determination of information updates intended for each display unit the usage of the public transportation vehicles as data couriers for providing the updates to the display units solves many of the problems relating to keeping the plurality of display units up-to-date with display unit-specific information.

According to an embodiment, the information representation unit is self-powered in terms of power supply. In other words, the power supply of the public display unit may be provided, for example, only by means of a solar cell or a battery. Additionally or alternatively, power supply means based on wind energy or a fuel cell may be used. Thus, a completely wireless (standalone) public display may be provided; no cabling is needed for the power supply or the data transmission. This provides significant savings both in installation and operating costs, since no installation costs due to cabling are incurred and the power consumption costs are minimal. It is, however, noted that the above-described method for providing the updated information to the display unit may be applied even if the power supply of the public display unit is provided by means of a power cable.

According to an embodiment, the information is transmitted between the mobile node and the information representation unit using Bluetooth Low Energy (BLE) transmitters and receivers. BLE is one of the most power efficient short-range technologies currently available, and especially in case of standalone public displays the usage of BLE contributes to the important object of keeping power consumption minimal.

A skilled person appreciates that as the short-range low power transmission technologies advance, any other technology, such as ANT multicast wireless sensor network technology developed by the company ANT Wireless or ZigBee technology defined in IEEE standard 802.15.4, may be used instead of BLE. Moreover, the future 5G wireless networks will most probably include one or more short-range low power transmission technologies, which may be utilised herein. Further, at least in some embodiments it may be possible to use wireless technologies providing only a low data rate, such as the industrial, scientific and medical (ISM) radio bands, especially the unlicensed bands 433 MHz and 860 MHz.

According to an embodiment, the information representation unit comprises one or more sensors arranged to detect status information relating to the operation conditions of the information representation unit and/or monitoring information about the surroundings of the information representation unit, and the method further comprises transmitting, in response to the mobile node approaching said information representation unit, the status and/or monitoring information from a short-range low power transmitter of the information representation unit to a short-range low power receiver of the mobile node. Thereby, the bi-directional communication between the display unit and the mobile node provides means for collecting and distributing status information regarding the display unit and/or monitoring information about the surroundings of the display unit. The mobile node may then forward the status and/or monitoring information to the network server for analysis.

The status information may relate to, for example, diagnosis data of the display unit, error notifications, battery charge level, battery lifetime information, health status of display components, etc. The status information obtained via the sensors may relate to, for example, the operating conditions of the display unit, such as temperate, humidity, etc. When the status information is transmitted to the network server, it may then determine whether maintenance or service of the display unit is needed.

The monitoring information may relate to, for example, passengers using the particular bus stop or station; the number of passengers in a time unit, the variation in the number of passengers in terms of day time and a week day, etc. The monitoring information may relate to, for example, traffic passing the particular bus stop or station; the number of vehicles in a time unit, the variation in the number of vehicles in terms of day time and a week day, etc. When the monitoring information is transmitted to the network server, it may then analyse, for example, traffic around the display unit, e.g. rush hours of the traffic, how crowded the particular bus stop or station is, etc.

According to an embodiment, the mobile node is a public transportation vehicle, such as a train, a tram, a metro train or a bus, arranged to travel a predetermined route. Thus, the existing public transportation system provides a ready-made platform for the mobile nodes, only minor modifications by adding the short-range low power transceivers may be needed.

According to an embodiment, the information to be transmitted to the information representation unit comprises at least time table information about one or more public transportation vehicles travelling on a predetermined route passing in the vicinity of said at least one information representation unit. Stop- or station-specific time table information is a good example of information that needs to be updated frequently and is different for each information representation unit.

Thus, a public transportation vehicle, such as a bus, travelling pass a particular display unit may be provided with time table information about the expected arrival times of next buses arriving to the bus stop. When the bus arrives at the bus stop having said particular display unit, the time table information is transmitted to the display unit using the short-range low power transceiver and the expected arrival times of next buses arriving to the bus stop are updated to the display. The time table information may additionally or alternatively be provided in a form of an audio message. For example, when a metro train arrives at the metro station having said particular information representation unit, the time table information is transmitted e.g. as an audio file to the information representation unit using the short-range low power transceiver and the expected arrival times of next metro trains arriving to the metro station may be announced via a loudspeaker.

According to an embodiment, the method further comprises transmitting, from said one or more public transportation vehicles, location information and identity of each vehicle periodically to at least one server; updating, by said at least one server, time table information regarding public transportation vehicles approaching said information representation unit on the basis of the location information and identities of the public transportation vehicles; and transmitting the updated time table information at least to the public transportation vehicle arriving next in the vicinity of the information representation unit. Hence, the public transportation vehicles of the system may autonomously update their location information together with the identity information to the network server periodically. The network server may then update the stop- or station-specific time table information accordingly, determine the next vehicle arriving to a particular stop or station, and then transmit the updated stop- or station-specific time table information to the vehicle arriving next to said stop or station. Thereupon, the updated time table information is transmitted to the information representation unit.

According to an embodiment, said at least one server belongs to a server cloud arranged to implement a service managing said time table information and at least one public transportation vehicle comprises a processing unit arranged to operate as a cloud edge server in said service. Thus, the information to be delivered to/from the display units may implemented as a cloud-based system, herein referred to as information update service, where the information may be managed by a plurality of nodes (servers). The public transportation vehicles may be provided with a processing unit such that at least a part of the information processing may be carried out in the vehicle, the processing unit thereby operating as a node (cloud edge server) of the cloud. The vehicles may be assigned to process information only related to the display units locating along their route, which facilitates the processing of the information in the network servers.

Figure 3:
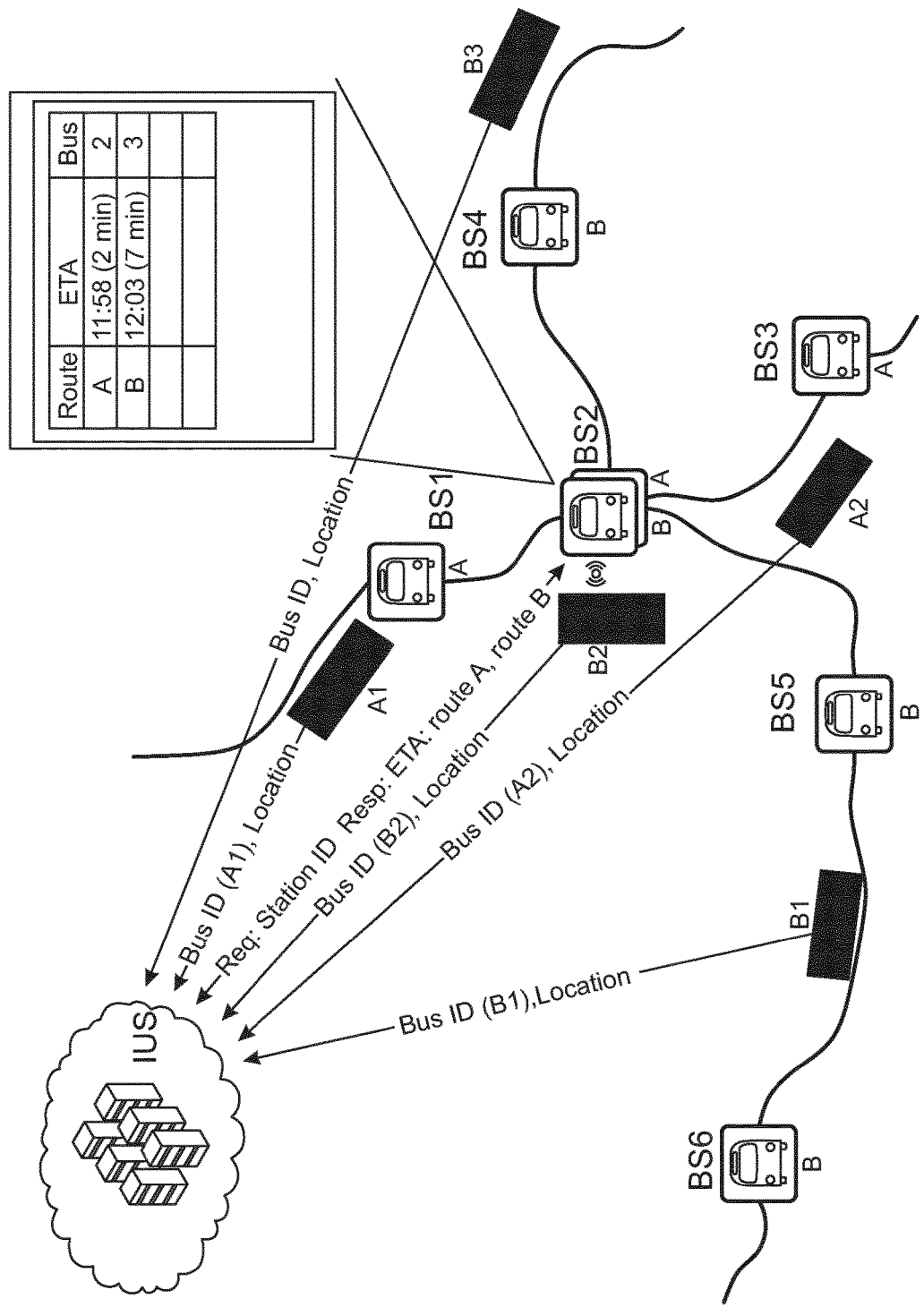
FIG. 3 shows an example configuration of a system according to an embodiment.

In the following, various embodiments are described by referring to FIG. 3, where an example with two bus routes (A and B) is shown. FIG. 3 shows two buses (A1, A2) driving the route A and three buses (B1, B2, B3) driving the route B. Along the route A, FIG. 3 shows three bus stops (BS1, BS2, BS3), and along route B, FIG. 3 shows four bus stops (BS4, BS2, BS5, BS6). Thus, bus stop BS2 is common for both routes A and B.

Each bus transmits its identity and location information periodically to the information update service (IUS), which continuously updates time table information for all routes based on the periodic location information. The IUS may also determine, based on the periodic location information, the next bus arriving to a particular bus stop. In FIG. 3, the IUS may, for example, determine that bus B1 is the next bus arriving to the bus stop BS6. The IUS may then transmit the updated time table information of the bus stop BS6 to the bus B1. When mobile node (i.e. bus B1) arrives in the vicinity of the bus stop BS6, a wireless link is established between the display unit and the mobile node using the short-range low power technology. Thereupon, either the display unit may requests time table information from the bus or the bus may automatically push the time table information to the display unit. The updated time table information comprising, for example, the expected arrival times of buses B2 and B3 to the bus stop BS6, may then be shown on the display.

Herein, all mobile nodes (e.g. buses) may deliver data for any bus stop and/or route. In FIG. 3, bus B2 (driving route B) arrives at the bus stop BS2, which is common for both routes A and B. The bus B2 provides the display unit with the time table information for routes A and B, and the expected arrival times of buses A2 (arriving at 11:58) and B3 (arriving at 12:03) are shown on the display.

According to an embodiment, it is also possible that the mobile node (i.e. a bus in the example of FIG. 3) arriving to the display unit does not have the updated time table information. In such case, when the wireless link between the display unit and the mobile node has been established, the display unit may request the updated time table information from the mobile node. The mobile node forwards the request to the information update service, which responds with time table data tailored for the requesting station.

In the above examples the mobile node has been described by referring to a public transportation vehicle. The mobile node may also be any other vehicle moving along a predetermined rout. Moreover, the embodiments are not limited to vehicles, but at least some of the embodiments are applicable, for example, to any portable or handheld communication devices, such mobile phones, smart phones, tablets or laptop computers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such non-transitory physical media as memory chips, or memory blocks implemented within the processor, magnetic media such as hard disk or floppy disks, and optical media such as for example DVD and the data variants thereof, CD.

A skilled person appreciates that any of the embodiments described above may be implemented as a combination with one or more of the other embodiments, unless there is explicitly or implicitly stated that certain embodiments are only alternatives to each other.

With the arrangement described above, automated updates of display unit information are enabled by utilizing existing elements of the public transport ecosystem. No manual updates or power consuming wireless component are needed for wireless displays in order to carry out the updates. The arrangement also enables distribution and delivery of different information bi-directionally within the system consisting of plurality of different mobile nodes.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A method for providing information to information representation units, the method comprising:
   determining, in a network server, information to be provided to at least one information representation unit, wherein the information to be transmitted to the information representation unit comprises at least time table information about one or more public transportation vehicles travelling on a predetermined route passing in the vicinity of said at least one information representation unit;
   transmitting the information to at least one mobile node travelling on a predetermined route passing in the vicinity of said at least one information representation unit;
   in response to the mobile node approaching said at least one information representation unit, transmitting the information from a short-range low power transmitter of the mobile node to a short-range low power receiver of the information representation unit;
   transmitting, from said one or more public transportation vehicles, location information and identity of each vehicle periodically to said network server;
   updating, by said network server, timetable information regarding public transportation vehicles approaching said information representation unit on the basis of the location information and identities of the public transportation vehicles;
   transmitting the updated timetable information at least to the public transportation vehicle arriving next in the vicinity of the information representation unit; and
   transmitting the updated timetable information from a short-range low power transmitter of the public transportation vehicle to the short-range low power receiver of the information representation unit.

2. The method according to claim 1, wherein the information representation unit is self-powered in terms of power supply.

3. The method according to claim 1, wherein the information is transmitted between the mobile node and the information representation unit using Bluetooth Low Energy (BLE) transmitters and receivers.

4. The method according to claim 1, wherein the mobile node is a public transportation vehicle, such as a train, a tram, a metro train or a bus, arranged to travel the predetermined route.

5. The method according to claim 1, wherein said network server belongs to a server cloud arranged to implement a service managing said time table information and at least one public transportation vehicle comprises a processing unit arranged to operate as a cloud edge server in said service.

6. A system comprising at least one network server, a plurality of information representation units and at least one mobile node arranged to travel on a predetermined route passing in the vicinity of at least one information representation unit, wherein the network server is arranged to:
   determine information to be provided to at least one information representation unit, wherein the information to be transmitted to the information representation unit comprises at least time table information about one or more public transportation vehicles travelling on a predetermined route passing in the vicinity of said at least one information representation unit;
   transmit the information to said at least one mobile node; and
   the mobile node is arranged, in response to approaching said at least one information representation unit to transmit the information from a short-range low power transmitter of the mobile node to a short-range low power receiver of the information representation unit;
   transmit its location information and identity periodically to the network server;
   wherein the network server is configured to:
   update timetable information regarding the mobile nodes approaching said information representation unit on the basis of the location information and identities of the mobile nodes; and
   transmit the updated timetable information at least to the mobile node arriving next in the vicinity of the information representation unit,
   wherein the mobile node arriving next in the vicinity of the information representation unit is configured to transmit the updated timetable information from a short-range low power transmitter of the public transportation vehicle to the short-range low power receiver of the information representation unit.

7. An apparatus comprising at least one processor and at least one memory, said at least one memory stored with code thereon, which when executed by said at least one processor, causes the apparatus to:
   determine information to be provided to at least one information representation unit, wherein the information to be transmitted to the information representation unit comprises at least time table information about one or more public transportation vehicles travelling on a predetermined route passing in the vicinity of said at least one information representation unit;
   transmit the information to at least one mobile node travelling on a predetermined route passing in the vicinity of said at least one information representation unit for forwarding the information to the information representation unit;
   receive periodically, from one or more public transportation vehicles, arranged to travel a predetermined route, location information and identity of each vehicle;
   update timetable information regarding public transportation vehicles approaching said information representation unit on the basis of the location information and identities of the public transportation vehicles; and
   transmit the updated timetable information at least to the public transportation vehicle arriving next in the vicinity of the information representation unit to be transmitted further to the information representation unit.

8. The apparatus according to claim 7, wherein said apparatus is a server belonging to a server cloud arranged to implement a service managing said timetable information.

9. A non-transitory computer readable storage medium stored with code thereon for use by an apparatus, which when executed by a processor, causes the apparatus to:
   determine information to be provided to at least one information representation unit, wherein the information to be transmitted to the information representation unit comprises at least time table information about one or more public transportation vehicles travelling on a predetermined route passing in the vicinity of said at least one information representation unit;
   transmit the information to at least one mobile node travelling on a predetermined route passing in the vicinity of said at least one information representation unit for forwarding the information to the information representation unit;
   receive periodically, from one or more public transportation vehicles, arranged to travel a predetermined route, location information and identity of each vehicle;
   update timetable information regarding public transportation vehicles approaching said information representation unit on the basis of the location information and identities of the public transportation vehicles; and
   transmit the updated timetable information at least to the public transportation vehicle arriving next in the vicinity of the information representation unit to be transmitted further to the information representation unit.

* * * * *